Feb. 16, 1926.
A. H. GUARD
1,573,399
COMBINED CORN HARVESTER AND STALK CUTTER
Filed Sept. 1, 1920     3 Sheets-Sheet 2
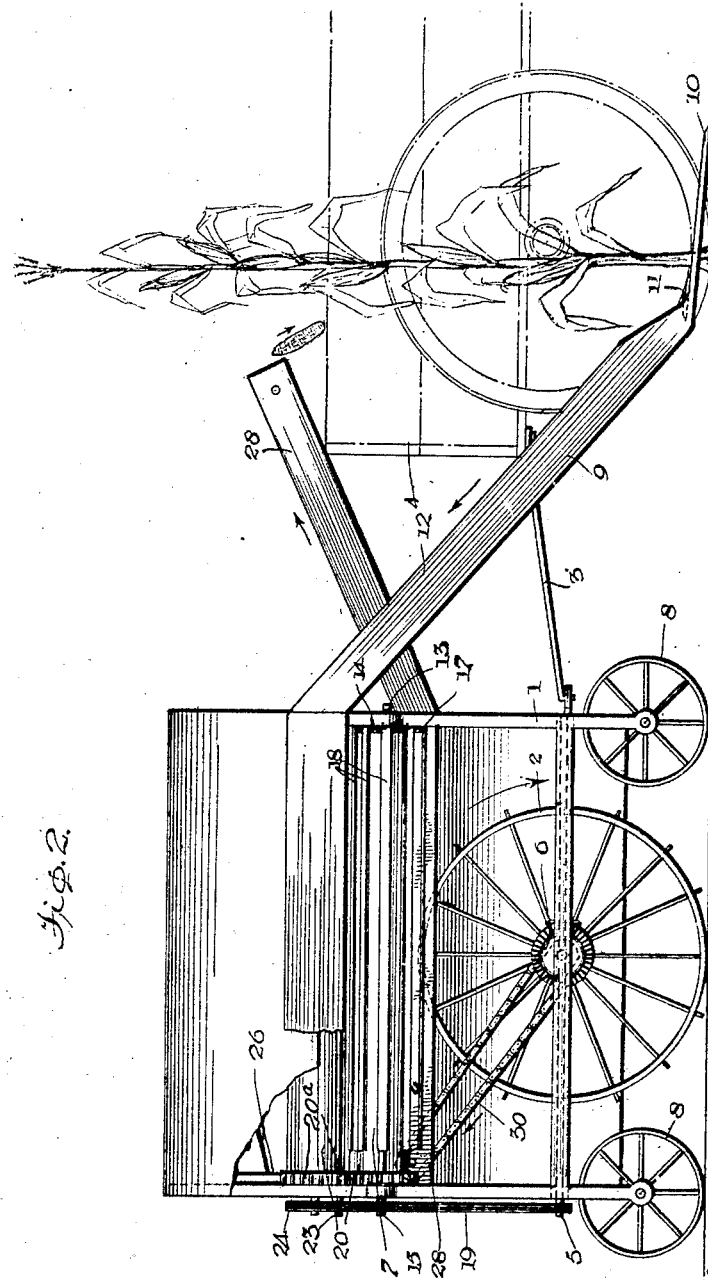
Inventor
Abiah H. Guard,

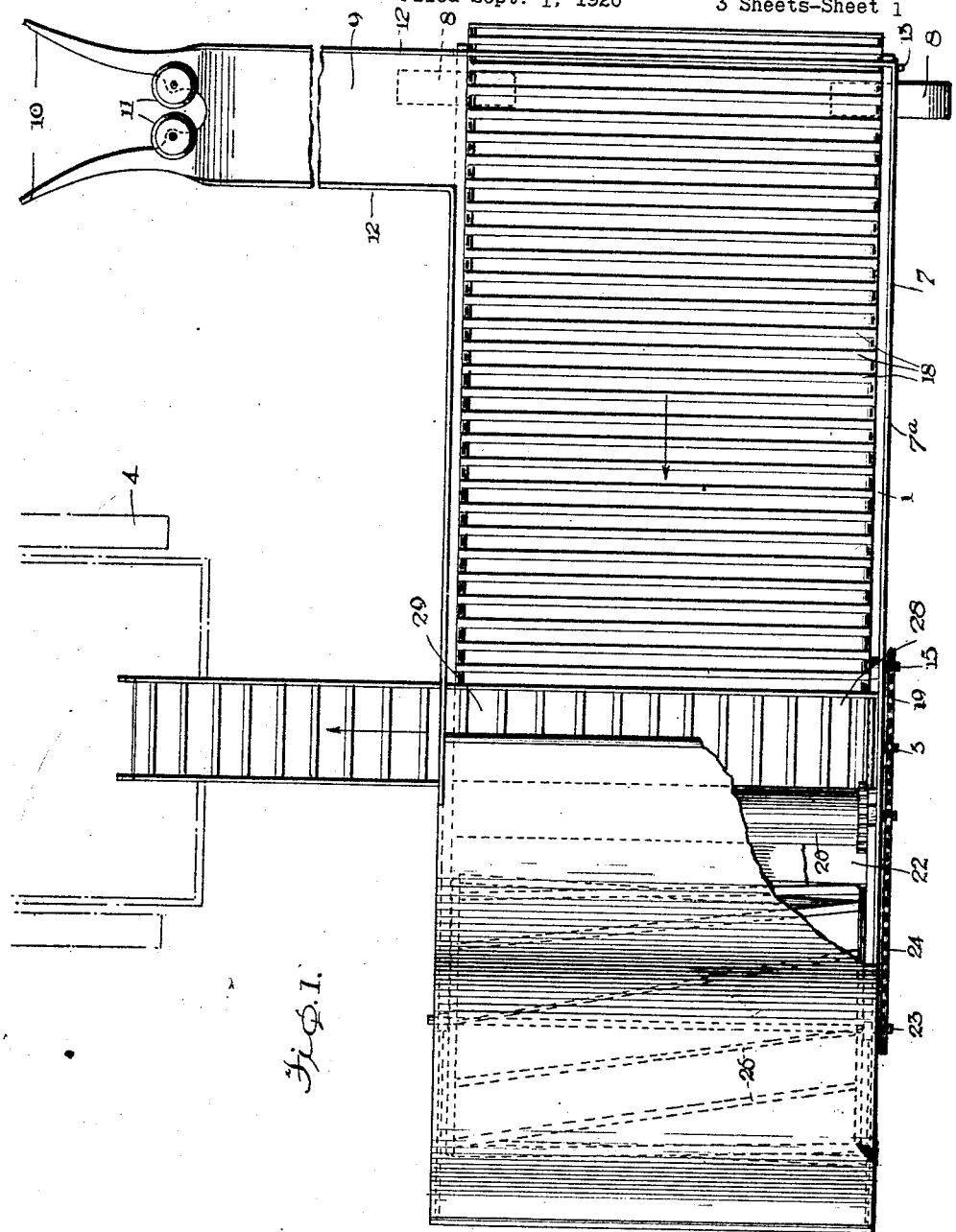

Feb. 16, 1926.
A. H. GUARD
1,573,399
COMBINED CORN HARVESTER AND STALK CUTTER
Filed Sept. 1, 1920   3 Sheets-Sheet 3
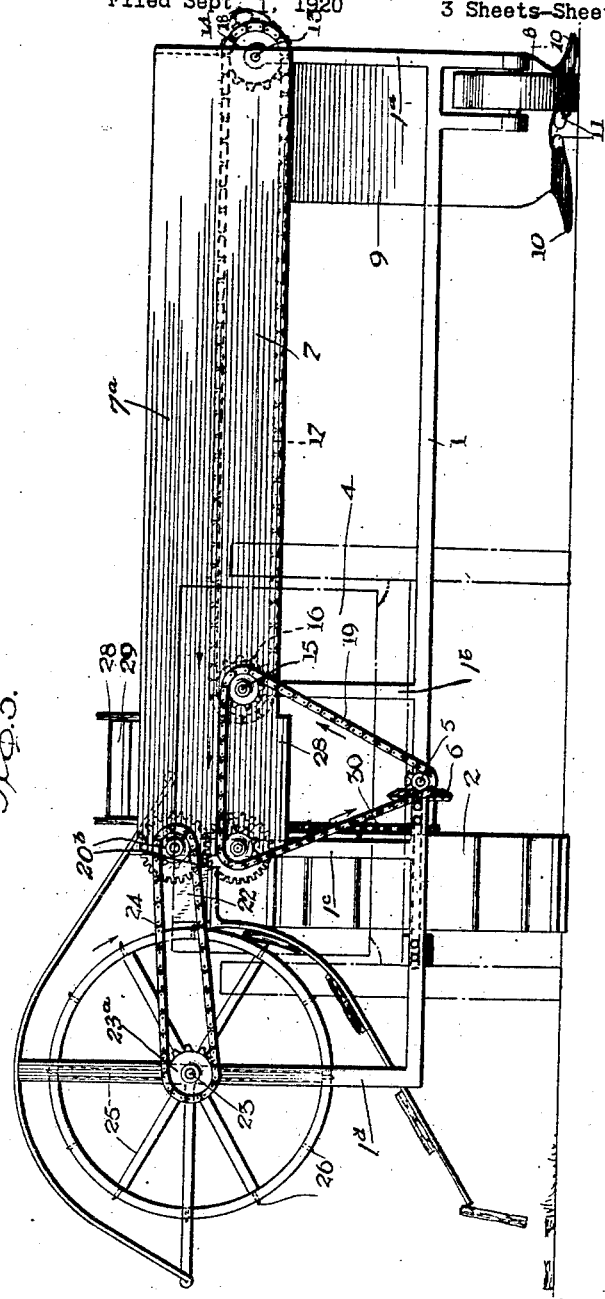
Inventor
Abiah H. Guard,
By 
Attorney Patented Feb. 16, 1926.

1,573,399

UNITED STATES PATENT OFFICE.

ABIAH HAYES GUARD, OF COLFAX, INDIANA.

COMBINED CORN HARVESTER AND STALK CUTTER.

Application filed September 1, 1920. Serial No. 407,325.

*To all whom it may concern:*

Be it known that I, ABIAH HAYES GUARD, a citizen of the United States, residing at Colfax, in the county of Clinton and State of Indiana, have invented certain new and useful Improvements in a Combined Corn Harvester and Stalk Cutter; and I do hereby declare the following to be a full, clear, and exact description of the invention, such as will enable others skilled in the art to which it appertains to make and use the same.

This invention relates to corn harvesters and corn stalk cutters combined and it consists in the novel features hereinafter described and claimed.

An object of the invention is to provide in a unitary machine means for lifting and gathering stalks as they stand in a row in the soil, means for cutting the stalks while they are in erect position, combination with a belt or conveyor adapted to receive and carry them with their butt ends foremost to a set of rolls which pinch the ears from the stalks and remove the shucks from the ears, means for conveying the ears to a receptacle and means for reducing the stalks which have been deprived of the ears into sections and permitting the sections to fall upon the ground.

With this object in view the unitary machine comprises a frame mounted upon a bull wheel which in turn is operatively connected with a master shaft journaled upon the frame. This master shaft is operatively connected with the various elements and features of the unitary machine. A table is connected with the frame and extends to one side thereof and is supported upon wheels. A conveyor belt is movably mounted along the table. A chute is carried at the outer portion of the table and at the forward end of the chute and disposed forwardly are carried a pair of spaced guides. The forward end portions of the guides are diverged from each other. Cutting disks or knives are carried at the inner ends of the guides and extend across the throat or space between the same. Stalk directing boards are mounted at the side edges of the table. A set of snapping rolls is mounted at the inner end of a conveyor belt employed and is adapted to receive the stalks butt endwise between them. A conveyor is located below the snapping rolls and is adapted to receive the nude ears as they fall from the husks. These ears are carried in a forward direction and deposited in the body of a truck which is used as means for pulling the corn harvester and corn stalk cutter over the fields. When the truck is filled with ears it is detached from the harvester and another truck is applied and the operation is continued. Immediately behind the snapping rolls is located a throat or passageway which receives the stalks after they pass through the snapping rolls. The stalks after passing through said throat are cut into sections by a rotating cutter and such sections then fall upon the ground.

In the accompanying drawings:—

Figure 1 is a top plan view of the combined corn harvester and stalk cutter.

Figure 2 is a side elevation of the same.

Figure 3 is a rear elevation of the same.

As illustrated in the accompanying drawing the combined corn harvester and stalk cutter comprises a frame 1 mounted upon a bull wheel 2 and having a stub tongue 3 attached to the forward side thereof. The tongue 3 may be connected with a truck 4 and by the said truck the machine may be drawn over a field. A master shaft 5 is journaled upon the frame 1 and is operatively connected with the bull wheel by means of a transmission mechanism 6. This mechanism may be the usual sprocket wheels and chains or any other suitable means for rotating the shaft from the bull wheel as the machine moves over the surface of the ground.

A table 7 is supported at its inner end on the frame 1 by upstanding bars 1ª, 1ᵇ, and 1ᶜ, and is supported at its outer end upon wheels 8 which are adapted to travel upon the surface of the ground. The table 7 is provided at its outer end and at its forward edge with a forwardly and downwardly inclined chute 9 to the forward end of which are attached forwardly and outwardly diverging guides 10. Cutting disks 11 are journaled for rotation at the inner ends of the guides and bridge the space between the guides. Boards 12 are mounted at the outer side edges of the table and chute and are adapted to receive the cut stalks and incline them and deposit them in a reclining posture upon the table by any suitable conveying means (not shown) and the conveyor operating thereon and which will be described hereinafter. As the machine moves along a row of stalks the row is received between the guides and the stalks are cut by the disks leaving their stumps in the ground while the portions of the stalks which bear the ears are adapted to be deposited on the table as hereinbefore described.

A shaft 13 is journaled for rotation at the outer portion of the table 7 and is provided with sprocket wheels 14. A shaft 15 is journaled for rotation at the inner portion or wall 7ª of the table 7 and bar 1ᵇ and is provided with sprocket wheels 16. Chains 17 are trained around the sprocket wheels 14 and 16 and are provided with cross slats 18 and the chains and the slats constitute the conveyor hereinbefore referred to. The stalks are deposited upon the slats with their butt ends disposed toward the shaft 15. A transmission mechanism 19 operatively connects the shaft 15 with the master or power shaft 5 and is adapted to operate the conveyor which carries the stalks. Rolls 20 are journaled at the inner edge of the table 7 in wall 7ª and bar 1ᶜ and are operatively connected together by means of gear wheels 20ª whereby the adjacent sides of the rolls rotate in the same direction. Said transmission mechanism 19 also operatively connects the rolls 20 with the master shaft 5. As the stalks approach the rolls 20 the butt ends of the stalks are received between the rolls and when the ears arrive at the rolls they are squeezed or broken from the stalks and squeezed out of the husks. A throat or passageway 22 is located behind the rolls 20 and is adapted to receive the stalks as they pass from between the rolls. A shaft 23 is journaled for rotation upon an upstanding bar 1ᵇ of the frame 1 and is operatively connected with the master shaft by means of a transmission mechanism 24 consisting of a chain passing directly over sprockets 20ᵇ and 23ª. Radially disposed arms 25 are attached to the shaft 23. The said arms 25 carry spirally disposed blades 26 at their outer ends which are adapted to move across the inner end of the throat or passageway 22 and cut the stalks into sections or pieces as they emerge from the throat. These sections fall upon a chute and are deposited upon the surface of the ground.

The ears which are removed from the stalks by the action of the rolls 20 as hereinbefore described fall into a trough 28 which is located below the rolls and in a plane between the rolls and the inner end of the table 7. A belt 29 is mounted for movement along the bottom of the trough 28 and is operated by a transmission mechanism 30 which operatively connects the belt with the bull wheel 2. The forward end of the trough 28 is upwardly and forwardly inclined and the delivery end of the trough is located above the body of the truck 4 when the truck is hitched to the machine. Therefore the ears which fall into the trough are carried by the belt 29 along the trough and delivered at the forward end of the trough into the body of the truck. When the body of the truck is filled with ears the truck is uncoupled from the harvester and another truck is hitched to the harvester. The loaded truck proceeds to a bin, barn or other place of storage, and unloads and in the meantime the truck which has been recently connected with the harvesting machine draws the machine over the field and continues the harvesting and stalk cutting operation.

The advantage gained by using the machine hereinbefore described and by following the method of harvesting corn as described is that it is not necessary to cut the stalks manually and assemble them in shocks for the purpose of permitting the ears to dry as is the usual practice. Therefore this manual operation is saved inasmuch as the ears are permitted to dry in the husks while the stalks are standing in the row. When the stalks are cut by the action of the cutting element of the machine the ears are immediately removed therefrom and denuded of the husks. At the same time the stalks are reduced to pieces and deposited upon the ground so that they may be turned under at the next plowing and may serve as fertilizer for improving the soil condition for the succeeding crop and the stalks are reduced to such small pieces that they will not interfere with the plowing implements or operations, nor will they interfere with the harrowing and seeding machines. Therefore the stalks are practically left at the point upon the field where they grew and consequently they are evenly distributed over the field and are turned back into the soil to improve the condition thereof. This saves the operation of spreading a fertilizer over the field preparatory to subsequent planting.

Having described the invention what is claimed is:

1. In a combined harvester and stalk cutting machine, means to detachably connect the machine to a vehicle to be drawn by the latter, a conveyor on the machine operable transversely to the path of travel of the machine arranged to receive stalks adjacent one end, means adjacent the other end of the conveyor to remove ears from their husks, means operable to deliver the ears, means operable to cut the stalks of the ears into fertilizer size, and means to lead the cut stalks onto the ground as fertilizer.

2. In a combined harvester and stalk cutting machine having its longer dimension disposed transversely to the line of travel, means to connect the machine to a vehicle to be drawn by the latter, a conveyor on the machine operable transversely to the path of travel of the machine to extend beyond one side of the vehicle to there receive stalks, means adjacent the other end of the conveyor to remove ears from their husks, means operable to deliver the ears, means operable to cut stalks and husks into fertilizer size after removal of the ears, and means extending beyond the other side of the machine to guide the cut stalks and husks onto the ground as fertilizer.

3. In a combined harvester and stalk cutting machine having its longer dimension disposed transversely to the line of travel, means to connect the machine to a vehicle to be drawn by the latter, a conveyor on the machine operable transversely to the path of travel of the machine to extend beyond one side of the vehicle to there receive stalks, means adjacent the other end of the conveyor to remove ears from the husks, means operable to deliver the ears forwardly, means operable to cut stalks and husks into fertilizer size after removal of the ears, means extending beyond the other side of the machine to guide the cut stalks and husks onto the ground as fertilizer, a wheel-supported frame for the machine having upright members at the rear, driving means for the different elements of the machine having shafts journaled in said upright members, a table adjacent said conveyor supported by said upright members, and a stalk-guiding wall at the rear of said table and above said upright members extending above the conveyor.

In testimony whereof I affix my signature.

ABIAH HAYES GUARD.